(12) United States Patent
Fan et al.

(10) Patent No.: US 9,595,072 B2
(45) Date of Patent: Mar. 14, 2017

(54) SECURITY SOCIAL NETWORK

(75) Inventors: James Fan, San Ramon, CA (US);
David Chen, Fremont, CA (US);
Richard Kuo, Mountain View, CA (US)

(73) Assignee: AT&T Intellectual Property I, L.P., Atlanta, GA (US)

(*) Notice: Subject to any disclaimer, the term of this patent is extended or adjusted under 35 U.S.C. 154(b) by 1079 days.

(21) Appl. No.: 12/963,427

(22) Filed: Dec. 8, 2010

(65) Prior Publication Data
US 2012/0150966 A1 Jun. 14, 2012

(51) Int. Cl.
| G06Q 50/26 | (2012.01) |
| H04W 64/00 | (2009.01) |
| G06Q 10/10 | (2012.01) |
| G08B 25/08 | (2006.01) |
| G08B 27/00 | (2006.01) |
| H04W 4/02 | (2009.01) |

(52) U.S. Cl.
CPC ........... *G06Q 50/26* (2013.01); *G06Q 10/107* (2013.01); *G08B 25/08* (2013.01); *G08B 27/003* (2013.01); *H04W 64/003* (2013.01); *H04W 4/02* (2013.01)

(58) Field of Classification Search
CPC ....... H04W 4/02; H04W 4/023; H04W 4/025; H04W 64/00; H04W 64/003
USPC .......................................................... 709/206
See application file for complete search history.

(56) References Cited

U.S. PATENT DOCUMENTS

| 5,515,419 | A | 5/1996 | Sheffer |
| 5,563,931 | A | 10/1996 | Bishop et al. |
| 6,466,258 | B1 | 10/2002 | Mogenis et al. |
| 6,784,833 | B1 | 8/2004 | Evans |
| 6,807,564 | B1 | 10/2004 | Zellner et al. |
| 6,816,090 | B2 | 11/2004 | Teckchandani et al. |
| 7,149,774 | B2 | 12/2006 | Zellner et al. |
| 7,158,026 | B2 * | 1/2007 | Feldkamp ........ G08B 13/19656 340/506 |

(Continued)

FOREIGN PATENT DOCUMENTS

EP 2107537 A1 * 10/2009

OTHER PUBLICATIONS

Alarm.com Overview—Android App., "Introducing the Alarm.com Android App", http://www.alarm.com/overview/overview_android.aspx, Jan. 26, 2011, 2 pages.

(Continued)

*Primary Examiner* — Shirley Zhang
(74) *Attorney, Agent, or Firm* — Baker & Hostetler LLP

(57) ABSTRACT

A security social network allows registered members to participate in providing security. Persons can register and devices can be registered via a security social media web site. When a security event occurs, a member can notify the security social network, which can notify all registered members and registered devices in the area of the event. Mobile communication devices of members in the area can be controlled to turn on respective cameras, video recorders, audio recorders, microphones, or the like. And, remotely operable devices can be controlled to monitor, record, and/or transmit data. Collaboration of security social network members with private security agencies, law enforcement agencies, neighborhood watch groups, or the like, can provide comprehensive, timely, and effective security.

18 Claims, 8 Drawing Sheets

(56) References Cited

U.S. PATENT DOCUMENTS

| | | | |
|---|---|---|---|
| 7,221,928 B2 | 5/2007 | Laird et al. | |
| 7,274,924 B2 | 9/2007 | Yoshioka | |
| 7,312,709 B2 | 12/2007 | Kingston | |
| 7,327,229 B1 | 2/2008 | Nichols et al. | |
| 7,518,500 B2 | 4/2009 | Aninye et al. | |
| 7,724,130 B2* | 5/2010 | Norstrom | G08B 27/001 340/3.1 |
| 7,808,378 B2* | 10/2010 | Hayden | G08B 27/003 340/3.52 |
| 2003/0055983 A1* | 3/2003 | Callegari | 709/227 |
| 2004/0165709 A1 | 8/2004 | Pence et al. | |
| 2007/0203738 A1* | 8/2007 | Jaschke | 705/1 |
| 2007/0229350 A1 | 10/2007 | Scalisi et al. | |
| 2007/0290830 A1* | 12/2007 | Gurley | G08B 13/1968 340/506 |
| 2008/0064413 A1 | 3/2008 | Breed | |
| 2008/0284587 A1* | 11/2008 | Saigh | H04M 1/72541 340/539.13 |
| 2009/0085760 A1 | 4/2009 | Lee | |
| 2009/0181640 A1* | 7/2009 | Jones | G08B 13/196 455/404.2 |
| 2010/0210240 A1* | 8/2010 | Mahaffey | H04L 41/0253 455/411 |
| 2011/0117878 A1* | 5/2011 | Barash | G08B 21/0211 455/404.2 |
| 2011/0149078 A1* | 6/2011 | Fan | G08B 13/19669 348/152 |
| 2011/0208545 A1 | 8/2011 | Kuester | |
| 2012/0092161 A1* | 4/2012 | West | G08B 25/005 340/540 |
| 2012/0149350 A1 | 6/2012 | Fan et al. | |

OTHER PUBLICATIONS

App Guide, "Motion Sensor Detection Alarm with Spy Audio RecorderCurrent Version: 1.2 (iOS 4.0 Tested)", MacWorld Insider, http://www.macworld.com/appguide/app.html?id=374758&expand=false, Jan. 26, 2011.

Author Unknown, "Eye See U—Video Surveillance", http://eyeseeu.ecaste.com, Jan. 26, 2011, 2 pages.

Buchanan, "Night Recorder App Review", http://www.iphonefreak.com/2010/01/night-recorder-app-revoew.html, Jan. 27, 2010, 12 pages.

Flag Solutions, "Thief Buster Antitheft Alarm", iTunes App Store, http://itunes.apple.com/us/app/thief-buster-antitheft-alarm/id327463179?mt=8, Feb. 11, 2010, 2 pages.

Fun at Work, "Silent Bodyguard—Your Personal Panic Button", http://itunes.apple.com/us/app/silent-bodyguard-your-personal/id347506878?mt=8, May 10, 2010, 2 pages.

Greenberg, "Android App Aims to Allow Wiretap-Proof Cell Phone Calls", Forbes, http://blogs.forbes.com/firewall/2010/05/25android-app-aims-to-allow-wiretap-proof-cell-phone-calls, May 25, 2010, 3 pages.

GSM Secure, "Silent Panic Buttons—Panic Alarm Systems", http://www.gsm-secure.co.uk/GSM-Panic-Alarrm.php, Jan. 26, 2011, 4 pages.

LoLer Apps, "Anti Theft Alarm: Step Away from the Phone!", www.alarm.com_itunes.apple.com$_{13}$ Anti-Theft-Alarm-stepaway/id368831595?mt=8, Jan. 26, 2011, 2 pages.

Martinelli, "iPhone App Arms Users with Silent Panic Button", Cult of Mac, http://www.cultofmac.com/iphone-app-arms-users-with-silent-panic-button/33862, Mar. 26, 2010, 11 pages.

Zagg Skins, "Undercover Discovers Your Lost or Stolen iPhone", AppCraver iPhone news and Reviews, http://www/appcraver.com/undercover, Jan. 26, 2011, 3 pages.

Martinelli, "iPhone App Arms Users with Silent Panic Button", http://www.cultofmac.com/iphone-app-arms-users-with-silent-panic-button/33862, Mar. 16, 2010, 10 pages.

Macedo "Caught Web-Handed: Social Media become Valuable Tool in Crime-Fighting", http://www.foxnews.com/scitech/2010/03/18/caught-web-handed-social-media-valuable-tool-crime-fighting/, Mar. 18, 2010, 3 pages.

Winder, "IBM: An Unlikely Crime-Fighting Superhero", http://www.daniweb.com/news/story276878.html, Apr. 8, 2010, 3 pages.

* cited by examiner

SECURITY SOCIAL NETWORK

TECHNICAL FIELD

The technical field generally relates to security, and more specifically relates to a social network for providing security, and even more specifically relates to using wireless communications devices for providing security.

BACKGROUND

Current techniques for providing security possess disadvantages. For example, when a crime is committed, if available, recorded video and/or audio data is analyzed to help solve the crime. Because this type of analysis occurs after the crime is committed, it does not prevent the crime. Also, due to the delay in time between the occurrence of the crime and the analysis of data, the perpetrator of the crime is provided time to escape. Further, it can be difficult, if not impossible to find witnesses to the crime. As another example, if a person is injured (motor vehicle accident), or is witnessing a dangerous situation (e.g., domestic violence), the person can call 911. However, the time it takes to dispatch help to the 911 scene may be too long. By the time help arrives, the person's injuries may have become fatal, or the domestic violence could have resulted in a fatality. As yet another example, when a child is separated from his or her parents at a shopping mall, typically, the parents will contact mall security. However, by the time mall security searches the mall, the child could have wandered away from the mall grounds, or have been abducted.

SUMMARY

A security social network provides timely and effective security for its members and others. The security social network allows registered members to participate in providing security (e.g., conducting a rescue mission, preventing a crime, obtaining evidence, etc.). In an example embodiment, persons can register via a security social media web site to become members. Members can have mobile communications devices that can be activated when an event occurs, such that the devices can monitor and/or record data (e.g., video, images, audio). Also, location determination capabilities on the mobile communications devices allow member's locations to be determined. Further, remotely operable devices such as cameras, microphones, or the like, located on buildings, in cars, on street lights, etc., can be registered with the security social network. When an event occurs, a member can notify the security social network (e.g., notify a security social network server), which can notify all members and devices in the area of the event. Mobile communication devices of members in the area can be controlled to turn on respective cameras, video recorders, audio recorders, microphones, or the like. And, remotely operable devices can be controlled to monitor, record, and/or transmit data. Collaboration of security social network members with private security agencies, law enforcement agencies, neighborhood watch groups, or the like, can provide comprehensive, timely, and effective security.

DETAILED DESCRIPTION OF ILLUSTRATIVE EMBODIMENTS

Figure 1:
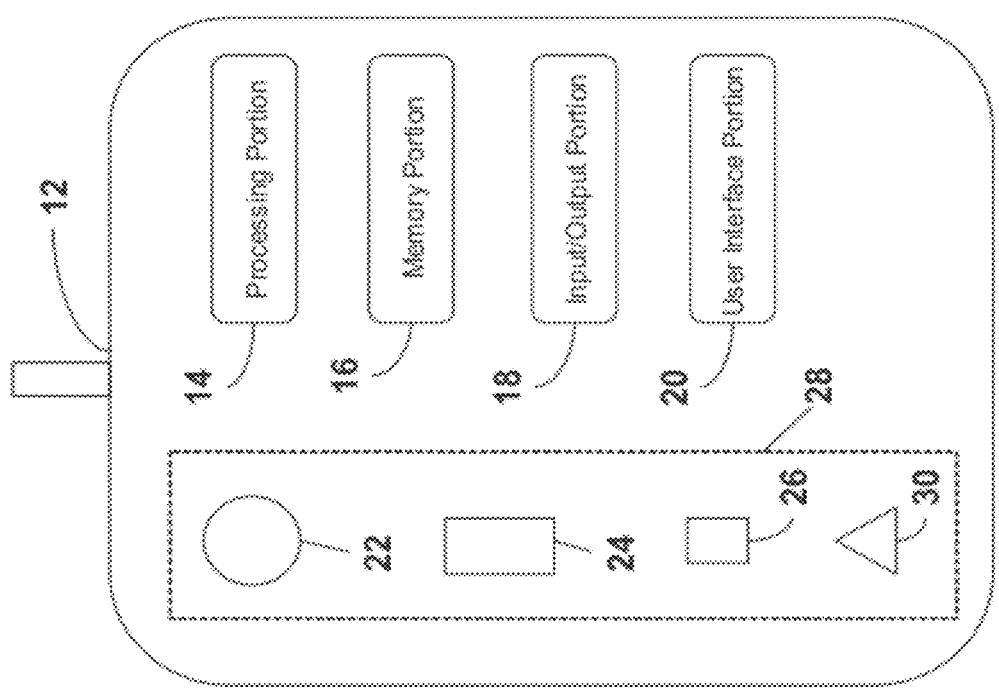
FIG. 1 is a block diagram of an example wireless communications device that is configurable to be utilized with the security social network.

A security social network comprises registered members and devices that work together to provide security to the members and others. In an example embodiment, a person can register to become a member of the security social network and devices can be registered with the security social network. As such, the security social network comprises a member network of persons and a device network. Persons can include individuals, private security companies, law enforcement agencies, neighborhood watch groups, or the like, for example. Devices can include any appropriated device capable of be controlled remotely and/or by a member, and capable of monitoring, recording, and/or transmitting data, such as still images, video, sound, etc. Security can be provided via the security social network in a variety of ways. For example, when a member of the security social network observes an event (e.g., a person being robbed at gun point), the member can provide a message to a server or the like, of the security social network. The message can include a description of the event. The description can be free form (generated by the member as the member is sending the message) or the message can be selected from a list of predetermined messages (e.g., kidnapping, motor vehicle accident, personal injure, robbery attempt, member injured, etc.).

A location of the device being used by the member to send the message also can be provided to the security social network server. Using the location information provided thereto, the security social network server determines other members at or proximate to the location of the event and any registered devices at or proximate to the location of the event. The security social network server can send a notice to members that are at or proximate to the location of the event about the event. The security social network server also can send a notification about the event to the appropriate authorities. The security social network server also can send control information to registered devices that are at or proximate to the location of the event. The control information can instruct the registered devices to, for example, turn power on, monitor optical information, monitor audio information (via a microphone or the like), record optical information, record audio information, transmit optical information, transmit audio information, or any combination thereof. For example, if a member registered a camera on a vehicle (e.g., rear view camera) to the security social network and the member is not in the car which is parked in a retail store parking lot, the camera can be remotely activated by the security social network server to capture events in the parking lot in real-time (as they are occurring). Information can be stored, for example, on a respective device, on a database, on the security social network sever, on a nearby device (e.g., a device can establish communication with another device and store information on the other device), or any combination thereof. Also, members, responsive to receiving the notice, can take action to prevent and/or mitigate any harmful effects of the event. For example, yell to the person with the gun that the police have been notified.

When an event is detected, if the security social network server determines that there are no members (except the member sending the help request message) in the proximate region of the event, but has determined that there are registered devices in the proximate region of the event, the security social network server can send information pertaining to the registered devices to appropriate law enforcement entities to facilitate control and acquisition of information via the registered devices.

Persons and devices can be registered with the security social network via any appropriate means, such as a web site, or the like. In an example embodiment, a member can invite his/her friends from other social web sites such as myspace.com, facebook.com, linkin.com, twitter.com, etc., to be a member. In an example embodiment, persons joining the security social network would be subject to security checks and identity validations prior to approval of membership. In an example embodiment, for privacy protection, an individual, upon becoming a member, could establish an avatar. The avatar would represent the individual to all other members of the security social network.

During registration, or at any time thereafter, a member can select a different opt-in levels, such as, for example, receive or not receive notification of a near by crime activity, allow or not allow devices to being controlled by security social network and/or a law enforcement agency, allow or not allow a device in danger to use near by registered devices to store/forward help messages, etc. A registered device can comprise any appropriate device capable of monitoring data, recording data, and/or transmitting data. Advantageously, a device can comprise a location determination capability. For example, a device could determine its own geographical location through any type of location determination system including, for example, the Global Positioning System (GPS), assisted GPS (A-GPS), time difference of arrival calculations, configured constant location (in the case of non-moving devices), any combination thereof, or any other appropriate means. Example devices include smart phones, cameras, video cameras, video cameras equipped in rear of vehicles, security cameras (e.g., company owned cameras stationed at locations within or exterior to a building, cameras overseeing parking lots, cameras overseeing streets and intersections, or the like).

A member's registered device can be trigged to send a message about an event via any appropriate triggering mechanism. A trigger can include a voice command to the device (e.g., a unique command that is not likely to be misinterpreted, such as "Robbery Robbery" or "Member In Danger"), a push button on the device, multiple depressions of a button on the device, the depression of a pattern of buttons on the device, a keyboard entry on the device, a soft key entry on the device, the entry of a pattern on the display of the device (e.g., enter X pattern with a finger on the display of the device), a designated movement of the device (e.g., move the device in the pattern of a large X), or any combination thereof, for example.

When an event is observed or made apparent to a member, the member can trigger his/her device to send the message (e.g., help request) to the security social network server, and the security social network server will cause a notification (e.g., member in danger) to be broadcast to all members in the proximate region. The member-in-danger notification will alert members in the region to be more aware. In an example embodiment, a member can accept the notification for a particular event. And, the accepting member can opt to join an assistance mission. The acceptance and indication that the member wants to assist can be provided via any appropriate means. For example, the acceptance/assistance indication can be provided via SMS, voice, video chat, Tweeter, of the like.

In an example embodiment, if the security social network server receives an indication that a member is in danger, the security social network server will provide notification of such in priority order and with tailored messages. For example, friends of the victims could be contacted first with tailored message like "your friend is in danger at xx location now—current time—". And all other members in the proximate region could receive a message like "member is in danger at xx location now—current time—".

In an example embodiment, the security social network server can determine members that may be potential witness to an event. A list of such members can be generated and provided to authorized agencies, such as law enforcement, courts, etc. If a member prefers to remain anonymous, a message can be sent to the member requesting the member to come forward as a witness.

In another example embodiment, a member can be rewarded for participation via the security social network. For example, a member could build (improve) his/her reputation by earning credits for participating in crime prevention and/or assistance via the security social network. And, for example, if a member earns a threshold amount of credits, the member's subscription fee to the security social network could be waived, or the like.

Members can tailor their respective subscriber profiles. For example, during registration, or at any time thereafter, a member can select a preferred language. And, textual and/or audio messages can be sent to the member's device in the selected preferred language.

An event does not necessarily have to comprise a crime. The event can comprise an appropriate event such as in indication to the security social network a member would like someone or something to be monitored, an indication that a person of thing has been lost, or the like. For example, a member can provide a message to the security social network that she is going hiking, where she will be hiking, and when she should return. The security social network can monitor the region where the member will be hiking, and if the member does not return around the predicted time, alert other members to search for the hiking member. Information obtained while monitoring the hiking region can be provide to member to help find the hiking member. As another example, a member can provide a message to the security social network that he has lost his cell phone and his best guess as to where he was when he lost it an when he lost it. The security social network can provide a request to the appropriate service provider to help locate the cell phone and temporarily block selected functionality of the cell phone (e.g., block outgoing calls/messages). The service provider could call the cell phone, and members in the area where the phone is thought to be could be requested to listen for the ringing cell phone. In an example embodiment, a special ring tone could be used when ringing the phone, for easy identification by members.

In an example scenario utilizing the security social network, a child is separated from his parents at a shopping mall. The parents, who are members of the security social network, reported that their child is missing to the mall authorities. The incident, location information, and a photograph of the child are provided to the security social network. This could be provided by the parents via a mobile communication device and/or by the mall authorities via a processor. All registered devices in the mall and surrounding the mall receive notifications and control information. Registered devices include security cameras in the parking lot of the mall and rear view cameras of vehicles parked in the parking lot of the mall. Consequently, the child is found near a rest room in a corner of the mall.

In another example scenario utilizing the security social network, a female member is approached by two men in a parking lot of a retail store. The women activates her mobile communications device to send a message to the security social network server, by repeating phrase help three times ("help, help, help). The mobile device, having been preconfigured to recognize this phrase as a trigger to send a message to the security social network server, sends a message indicating that the member is in danger and the location of the device. The security social network server notifies appropriate authorities and activates registered devices in the region proximate to the location of the device. As a result, security cameras, which are registered with the security social network, send real-time (as events occur) to the authorities. Also, the member's mobile communications device is activated to turn on audio monitoring functions and transmit the monitored audio information to the appropriate authorities. The authorities, listening to the audio of the men talking to the woman and seeing the video from the security cameras in the parking lot, conclude that the woman is in danger. Consequently, the authorities arrive on the scene before the woman is harmed.

In yet another example scenario utilizing the security social network, a teen makes a call to a friend to say goodbye before jumping off bridge. The friend prolongs the conversation and uses the Internet to enter a request to the security social network that the teen is in trouble, and provides the teen's cell phone number. Appropriate authorities are notified of the teen's situation. Also, the security social network server immediately locates near by registered devices and sends control information to activate the devices. One of the registered devices being a street camera covering the teen's location. The street camera captures the scene of the teen and the video is sent to the authorities. The security social network server also sends a notification message to registered devices of members in the proximate area along with the video of the teen. The teen is spotted and saved by two members who are near the teen's location and received the video notification.

FIG. 1 is a block diagram of an example wireless communications device 12 that is configurable to be utilized with the security social network. In an example configuration, the wireless communications device 12 is a mobile wireless device. The communications device 12 can include any appropriate device, mechanism, software, and/or hardware for facilitating the security social network as described herein. As described herein, the communications device 12 comprises hardware or a combination of hardware and software. In an example configuration, the communications device 12 comprises a processing portion 14, a memory portion 16, an input/output portion 18, a user interface (UI) portion 20, and a sensor portion 28 comprising at least one of a video camera portion 22, a force/wave sensor 24, a microphone 26, a moisture sensor 30, or a combination thereof. The force/wave sensor comprises at least one of a motion detector, an accelerometer, an acoustic sensor, a tilt sensor, a pressure sensor, a temperature sensor, or the like. The motion detector is configured to detect motion occurring outside of the communications device, for example via disturbance of a standing wave, via electromagnetic and/or acoustic energy, or the like. The accelerator is capable of sensing acceleration, motion, and/or movement of the communications device. The acoustic sensor is capable of sensing acoustic energy, such as a loud noise, for example. The tilt sensor is capable of detecting a tilt of the communications device. The pressure sensor is capable of sensing pressure against the communications device, such as from a shock wave caused by broken glass or the like. The temperature sensor is capable of sensing a measuring temperature, such as inside of the vehicle, room, building, or the like. The moisture sensor 30 is capable of detecting moisture, such as detecting if the communications device 12 is submerged in a liquid. The processing portion 14, memory portion 16, input/output portion 18, user interface (UI) portion 20, video camera portion 22, force/wave sensor 24, and microphone 26 are coupled together to allow communications therebetween (coupling not shown in FIG. 1). The communications device can comprise a timer (not depicted in FIG. 1).

In an example embodiment, the processing portion 14, utilizing information from the sensor portion 28, is capable of (via appropriate signal processing algorithms and techniques) to distinguish between a loud noise such a siren for example, and the sound of breaking glass. Thus, the communications device 12 is configured to distinguish between a triggering event and a false alarm (an event known not to be a triggering event). For example, the communications device can utilize spectral filtering, can compare known signatures of a triggering event with captured sensor information, or the like, to distinguish between a triggering event and a false alarm. In an example embodiment, a library of known types of triggering events (e.g., broken glass, sensor information indicative of a squealing tires, sensor information indicative of a squealing tires, a vehicle crash, sensor information indicative of a person calling for help, sensor information indicative of a car door be forcibly opened, etc,) can be maintained and updated as needed. The known signatures can be compared to received sensor information to determine if a triggering event is occurring.

In an example embodiment, the communications device can comprise a list of triggering event signatures preloaded by the service provider or the like. These signatures can be compared with information collected by one or more sensors. The correlated data can be ranked e.g., from 1 to 5 level, for example. Wherein, level 1 is indicative of general monitoring (implies any minor activity sensed, to which the communications device will react). And, level 5 can be indicative of a combination of predetermined levels, such as for example, (a) greater than or equal to xx (e.g., 60) decibel (dB) noise sensed, +greater than or equal to xxx (e.g., 10) lbs of pressure sensed+motion within 10 feet or less detected, (b) door unlocked in an unauthorized manner, (c) engine started not using the car key, (d) temperature exceed 120 degrees F., etc. Levels 2-4 can be indicative of sensor indications between level 1 and level 5. The subscriber can direct the communications device what to do based on the level detected. For example, one signature could be noise level 300 db and pressure 10 lbs to imply a glass broken event (a level 5 event).

In various embodiments, the input/output portion 18 comprises a receiver of the communications device 12, a transmitter of the communications device 12, or a combination thereof. The input/output portion 18 is capable of receiving and/or providing information pertaining to utilizing the security social network via the communications device 12 as described herein. The input/output portion 18 also is capable of communications with the security social network server, as described herein. For example, the input/output portion 18 can include a wireless communications (e.g., 2.5G/3G/GPS/4G) SIM card. The input/output portion 18 is capable of receiving and/or sending video information, audio information, control information, image information, data, or any combination thereof. In an example embodiment, the input/output portion 18 is capable of receiving and/or sending information to determine a location of the communications device 12. In an example configuration, the input\output portion 18 comprises a GPS receiver. In an example configuration, the communications device 12 can determine its own geographical location through any type of location determination system including, for example, the Global Positioning System (GPS), assisted GPS (A-GPS), time difference of arrival calculations, configured constant location (in the case of non-moving devices), any combination thereof, or any other appropriate means. In various configurations, the input/output portion 18 can receive and/or provide information via any appropriate means, such as, for example, optical means (e.g., infrared), electromagnetic means (e.g., RF, WI-FI, BLUETOOTH, ZIGBEE, etc.), acoustic means (e.g., speaker, microphone, ultrasonic receiver, ultrasonic transmitter), or a combination thereof. In an example configuration, the input/output portion comprises a WIFI finder, a two way GPS chipset or equivalent, or the like.

The processing portion 14 is capable of facilitating the security social network via the communications device 12 as described herein. For example, the processing portion 14 is capable of, in conjunction with any other portion of the communications device 12, detecting a trigger/triggering event and responsive thereto providing a message to a security social network, security social network server, controlling functions of the communications device 12 as provided by the security social network server, or the like, or any combination thereof. The processing portion 14, in conjunction with any other portion of the communications device 12, can provide the ability for users/subscribers to enable, disable, and configure various features of an application for utilizing the security social network as described herein. For example, a user, subscriber, parent, healthcare provider, law enforcement agent, of the like, can define configuration parameters such as, for example, an emergency contact list, voice/text/image/video options for an emergency call, threshold settings (e.g., timer settings, signature settings, etc.), to be utilized when sending a message to the security social network and/or other members and/or designated entities. The processing portion 14, in conjunction with any other portion of the communications device 12, enables the communications device 12 to covert speech to text when it is configured to also send text messages while utilizing the security social network. The processing portion 14, in conjunction with any other portion of the communications device 12, allows a subscriber to configure/define triggers and triggering events to send messages to the security social network as described herein.

In a basic configuration, the communications device 12 can include at least one memory portion 16. The memory portion 16 can store any information utilized in conjunction with the security social network as described herein. For example, the memory portion 16 is capable of storing information pertaining to location of a communications device 12, subscriber profile information, subscriber identification information, designated phone numbers to send video and audio information, an identification code (e.g., phone number) of the communications device, video information, audio information, control information, information indicative of signatures (e.g., raw individual sensor information, combination of sensor information, processed sensor information, etc.) of known types of triggering events, information indicative of signatures of known types of false alarms (known not to be a triggering event), or a combination thereof. Depending upon the exact configuration and type of processor, the memory portion 16 can be volatile (such as some types of RAM), non-volatile (such as ROM, flash memory, etc.). The communications device 12 can include additional storage (e.g., removable storage and/or non-removable storage) including, tape, flash memory, smart cards, CD-ROM, digital versatile disks (DVD) or other optical storage, magnetic cassettes, magnetic tape, magnetic disk storage or other magnetic storage devices, universal serial bus (USB) compatible memory, or the like. In an example configuration, the memory portion 16, or a portion of the memory portion 14 is hardened such that information stored therein can be recovered if the communications device 12 is exposed to extreme heat, extreme vibration, extreme moisture, corrosive chemicals or gas, or the like. In an example configuration, the information stored in the hardened portion of the memory portion 16 is encrypted, or otherwise rendered unintelligible without use of an appropriate cryptographic key, password, biometric (voiceprint, fingerprint, retinal image, facial image, or the like). Wherein, use of the appropriate cryptographic key, password, biometric will render the information stored in the hardened portion of the memory portion 16 intelligible.

The communications device 12 also can contain a UI portion 20 allowing a user to communicate with the communications device 12. The UI portion 20 is capable of rendering any information utilized in conjunction the security social network as described herein. For example, the UI portion 20 can provide means for entering text, entering a phone number, rendering text, rendering images, rendering multimedia, rendering sound, rendering video, or the like, as described herein. The UI portion 20 can provide the ability to control the communications device 12, via, for example, buttons, soft keys, voice actuated controls, a touch screen, movement of the mobile communications device 12, visual cues (e.g., moving a hand in front of a camera on the mobile communications device 12), or the like. The UI portion 20 can provide visual information (e.g., via a display), audio information (e.g., via speaker), mechanically (e.g., via a vibrating mechanism), or a combination thereof. In various configurations, the UI portion 20 can comprise a display, a touch screen, a keyboard, a speaker, or any combination thereof. The UI portion 20 can comprise means for inputting biometric information, such as, for example, fingerprint information, retinal information, voice information, and/or facial characteristic information. The UI portion 20 can be utilized to enter an indication of the designated destination (e.g., the phone number, IP address, or the like).

In an example embodiment, the sensor portion 28 of the communications device 12 comprises the video camera portion 22, the force/wave sensor 24, and the microphone 26. The video camera portion 22 comprises a camera and associated equipment capable of capturing still images and/or video and to provide the captured still images and/or video to other portions of the communications device 12. In an example embodiment, the force/wave sensor 24 comprises an accelerometer, a tilt sensor, an acoustic sensor capable of sensing acoustic energy, an optical sensor (e.g., infrared), or any combination thereof.

The communications device can be configured, and associated security services can be provided in various embodiments. In one example embodiment, the communications device comprises the video camera, the force/wave sensor, the microphone, the wireless communications SIM Card, a preconfigured outbound communication number, a battery slot (e.g., for a 9-volt battery, AAA battery, etc.), an operating/standby/off switch. In this embodiment, the communications service can offer the following features. The communications device uses an activation process similar to a wireless handset. When the communications device is switched to a stand-by mode, a delay is initiated (e.g., 20 second delay) before the force/wave sensor starts to operate. When the force/wave sensor detects an intrusion, the communications device will auto dial the preconfigured outbound communication number and start to transmit the captured video and audio information to the designated remote device (e.g., the security social network server).

In another example embodiment, the communications device comprises a key pad, a display (e.g., an LED display, or the like), a rechargeable battery pack, and a power indicator (e.g., light). The key pad can be an integral or attached part of the communications device or can be a remote key pad. Thus, a wireless key pad and a display can allow a user to key in outbound communication numbers, a secured pass-code, or the like. This pass-code allows the owner to disable the external operating/stand-by/off switch and to soft control the switch mode. When the communications device is switched/set to the stand-by mode, a delay can be initiated (e.g., 20 second delay) before the force/wave sensor starts to operate. When the communications device is equipped with a wireless key pad, the owner can set the mode remotely. When the force/wave sensor detects a trigger, the communications device can automatically dial the preconfigured outbound number and start to transmit the captured video and/or audio information to the designated remote device (e.g., security social network server).

In yet another example embodiment, the communications device comprises a two way speaker phone and GPS integration with a video screen. The video screen can optionally comprise a touch screen. A wireless key pad and a GPS video screen can allow a user to key in an outbound communication number, a secured pass-code, or the like. This pass-code allows the user to disable the external operating/stand-by/off switch and to soft control the switch mode. The communications device can receive an SMS type message from a remote device (e.g., a wireless communications device, security social network server) which causes the communications device to allow control of functionality of the communications device. The remote device can send SMS-type messages to the communications device to control the camera (angle, focus, light sensitivity, zoom, etc.) and the volume of the speaker phone. The communications device in conjunction with the GPS video capability allows a two way video and audio communication. Utilizing the GPS functionality, the user can be provided, via his/her wireless communications device, location information. Thus, if a car has been stolen, the owner can receive an indication of the location of the car overlaid on a geographical map. When receiving a communication, if the owner is on another call, the call can be preempted, (but not disconnect). Further, a centralized secured database can be utilized to store the video/audio information received from the communications device and can be associated with the communications device identification code and a timestamp. The centralized store video/audio information can be retrieved by subscriber/owner, security service agent, or law enforcement staff on demand.

Figure 2:
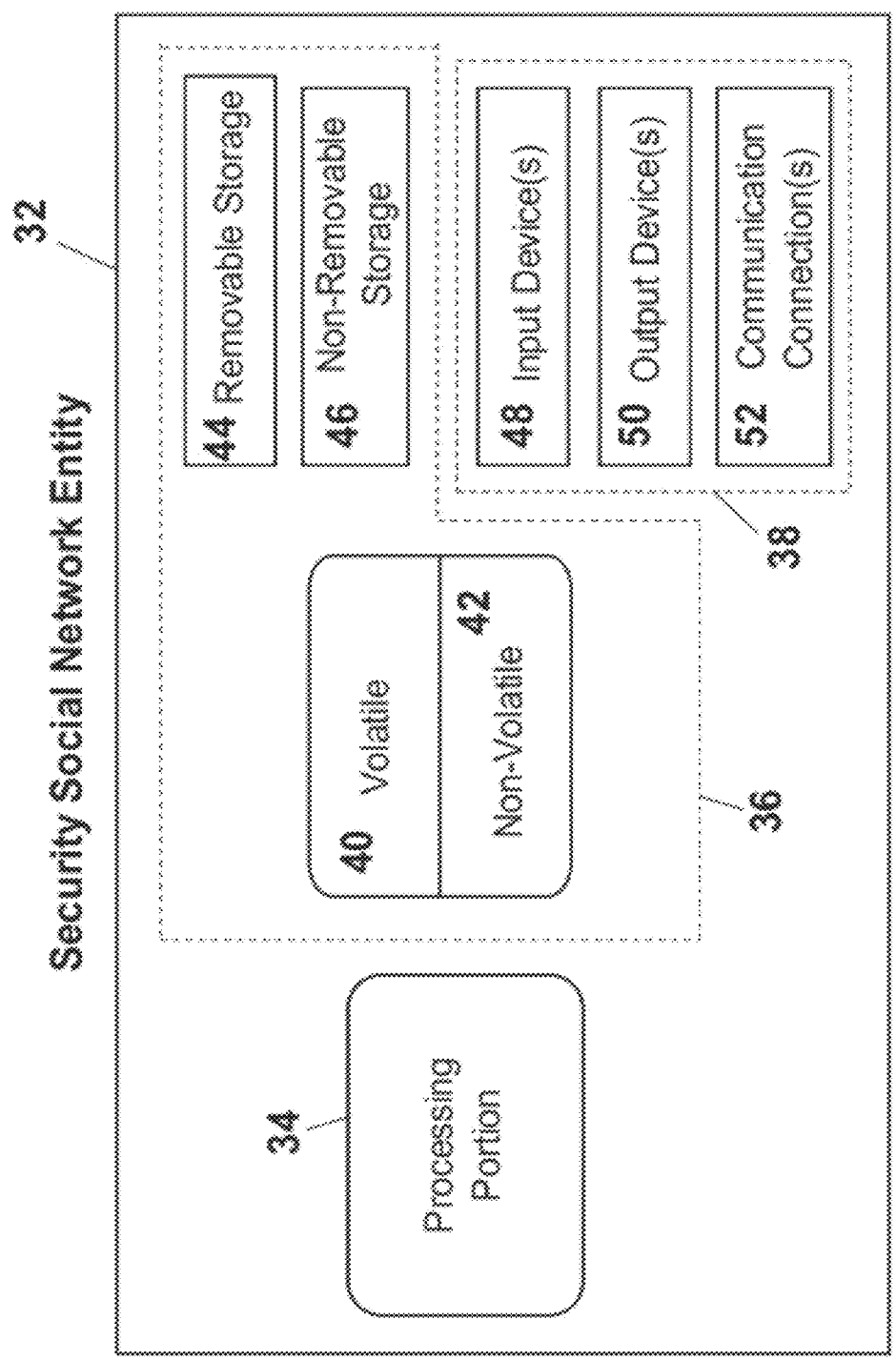
FIG. 2 is a block diagram of an example security social network entity.

FIG. 2 is a block diagram of an example security social network entity 32. The security social network entity 32 comprises hardware or a combination of hardware and software. When used in conjunction with a network, the functionality needed to implement a security social network can reside in any one or combination of network entities. The network entity 32 depicted in FIG. 2 represents any appropriate network entity, or combination of network entities, such as a processor, a server, a gateway, etc., or any combination thereof. In an example configuration, the network entity 32 comprises a component or various components of a cellular broadcast system wireless network. It is emphasized that the block diagram depicted in FIG. 2 is exemplary and not intended to imply a specific implementation or configuration. Thus, the network entity 32 can be implemented in a single processor or multiple processors (e.g., single server or multiple servers, single gateway or multiple gateways, etc.). Multiple network entities can be distributed or centrally located. Multiple network entities can communicate wirelessly, via hard wire, or a combination thereof.

In an example configuration, the network entity 32 comprises a processing portion 34, a memory portion 36, and an input/output portion 38. The processing portion 34, memory portion 36, and input/output portion 38 are coupled together (coupling not shown in FIG. 2) to allow communications therebetween. The input/output portion 38 is capable of receiving and/or providing information from/to a device (e.g., device 12) configured to be utilized with the security social network. For example, the input/output portion 36 is capable of receiving/sending a call, instructions from/to a device to configure/control the device, information pertaining to registered devices, information pertaining to registered members, information pertaining to appropriate authorities, as described above. In various configurations, the input/output portion 36 can receive and/or provide information via any appropriate means, such as, for example, optical means (e.g., infrared), electromagnetic means (e.g., RF, WI-FI, BLUETOOTH, ZIGBEE, etc.), acoustic means (e.g., speaker, microphone, ultrasonic receiver, ultrasonic transmitter), or a combination thereof. In various configurations, the input/output portion 36 can receive and/or provide information wirelessly, via a wired connection, or a combination thereof.

The processing portion 34 is capable of performing functions associated with the security social network, as described herein. That is, a communications device can perform functions internally (by the device) and/or utilize the network entity 32 to perform functions. For example, the processing portion 34 is capable of processing a message pertaining to occurrence of an event, determining a location (e.g., of a device, member, etc.), determining a region proximate to a location, determining registered devices within a region, determining how a device is to be controlled, determining devices that are registered with the security social network, determining members that are registered with the security social network, as described herein, or any combination thereof.

The memory portion 36 can store any information utilized in conjunction with the security social network. Thus, a communications device can utilize its internal memory/storage capabilities and/or utilize memory/storage capabilities of the network entity 32. For example, the memory portion 36 is capable of storing information related to a message pertaining to occurrence of an event, a location (e.g., of a device, member, etc.), a region proximate to a location, registered devices within a region, how a device is to be controlled, devices that are registered with the security social network, members that are registered with the security social network, as described herein, or any combination thereof. Depending upon the exact configuration and type of network entity, the memory portion 36 can include computer readable storage media that is volatile 40 (such as dynamic RAM), non-volatile 42 (such as ROM), or a combination thereof. The network entity 32 can include additional storage, in the form of computer readable storage media (e.g., removable storage 44 and/or non-removable storage 46) including, but not limited to, RAM, ROM, EEPROM, tape, flash memory, smart cards, CD-ROM, digital versatile disks (DVD) or other optical storage, magnetic cassettes, magnetic tape, magnetic disk storage or other magnetic storage devices, universal serial bus (USB) compatible memory, or any other medium which can be used to store information and which can be accessed by the network entity 32. As described herein, a computer-readable storage medium is an article of manufacture.

The network entity 32 also can contain communications connection(s) 52 that allow the network entity 32 to communicate with other devices, network entities, or the like. A communications connection(s) can comprise communication media. Communication media typically embody computer readable instructions, data structures, program modules or other data in a modulated data signal such as a carrier wave or other transport mechanism and includes any information delivery media. By way of example, and not limitation, communication media include wired media such as a wired network or direct-wired connection, and wireless media such as acoustic, RF, infrared, and other wireless media. The term computer readable media as used herein includes both storage media and communication media. The network entity 32 also can include input device(s) 48 such as keyboard, mouse, pen, voice input device, touch input device, etc. Output device(s) 50 such as a display, speakers, printer, etc. also can be included.

Figure 3:
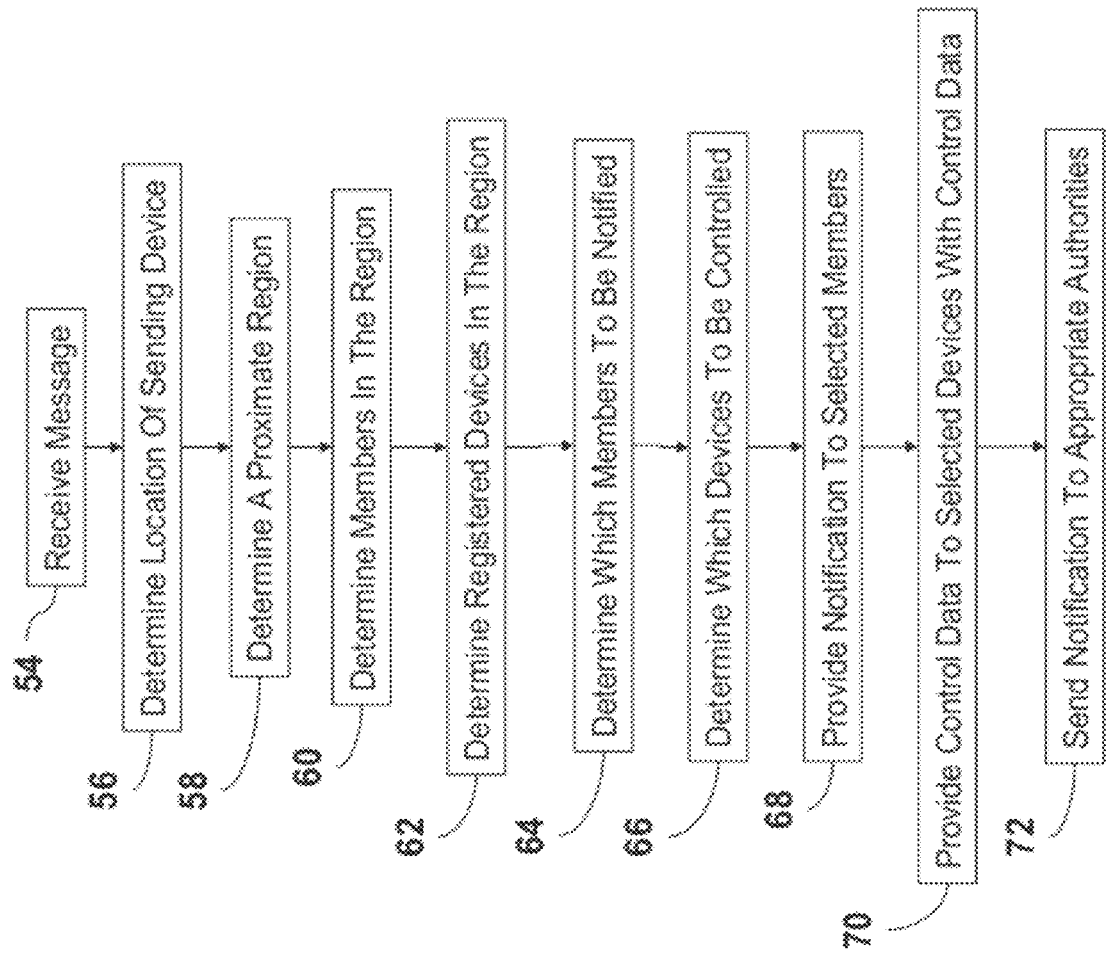
FIG. 3 is a flow diagram of an example process for implementing the security social network via a network entity.

FIG. 3 is a flow diagram of an example process for implementing the security social network via a network entity (e.g., security social network entity 32). A message is received at step 54. As described herein, the message can comprise an indication of an event, such as, for example, an occurrence of a crime, a article is lost, a person is lost, a person is in danger, a person wants to be monitored, or the like. The message can include location information pertaining to the location of the source of the message. The message can contain any other appropriate information, such as, for example, a picture, an image, video, text, of the like. In an example embodiment, the network entity confirms that the message was sent by a registered member of the security social network or was sent by a registered device of the security social network. Confirmation can be conducted in any appropriate manner. For example, a list of registered members can be compared to the subscriber associated with the source of the message, and/or a list of registered devices can be compared with the device associated with the source of the message. If a match is found, the member/device can be confirmed as being registered with the security social network.

A location is determined at step 56. In an example embodiment, the location is the location of the source of the message. As described herein, the location can be determined based on the location provided with the message and/or any other appropriate means, such as, for example, the Global Positioning System (GPS), assisted GPS (A-GPS), time difference of arrival calculations, configured constant location (in the case of non-moving devices), or any combination thereof. In an example embodiment, the message can include location information pertaining to other than a location of the source of the message. For example, the message can contain location information of another person (e.g., location of teen about to jump off bridge). A region proximate to the determined location is determined at step 58. As described herein, the proximate region can be any appropriate region proximate, such as, for example, the region including a building in with the location is located, a parking lot near the location, a field near the location, a highway/road near the location, or the like. In an example embodiment, the region may not be stationary. The region can be continuously updated as the nature of the event changes. For example, if the event involves a robbery, as the perpetrators are leaving the scene of the crime, the region will be updated to be proximate to the location of the perpetrators. Information pertaining to the location of the perpetrators can be provided by registered devices. Thus, the region can be stationary or dynamically changing.

At step 60, members in the region are determined. In an example embodiment, the network entity determines all registered members, determines the location of registered members, and determines if any members are located within the region. At step 62, registered devices in the region are determined. In an example embodiment, the network entity determines all registered devices, determines the location of registered devices, and determines if any registered devices are located within the region. At step 64, the network entity determines which members are to be notified. In an example embodiment, all members within the region are selected to be notified. In another example embodiment, members that may not be in the region and are predicted to be within the region are selected to be notified. For example, a member may be moving toward the region, and accordingly, the network entity could select the member to be notified. In an example embodiment, the region may be dynamically changing as described above, and thus members predicted to be within the dynamically changing region can be selected to be notified. At step 66, the network entity determines which registered devices are to be controlled and/or monitored. In an example embodiment, all members within the region are selected to be notified. In another example embodiment, registered devices may not be in the region but are predicted to be within the region are selected to be controlled/monitored. For example, a registered device (e.g., a camera on a moving vehicle) may be moving toward the region, and accordingly, the network entity could select the registered device to be controlled/monitored. In an example embodiment, the region may be dynamically changing as described above, and thus registered devices predicted to be within the dynamically changing region can be selected to be controlled/monitored.

Appropriate notification, as described herein, is provided to the selected members at step 68. And appropriate control/monitor data, as described herein, is sent to selected registered devices at step 70. Control data can instruct a registered device to monitor (audio, video, and/or still images) a situation, to store obtained (via monitoring) information, transmit obtained (via monitoring) information, make a noise or flash of light (e.g., strobe, siren, etc.) to ward off an attacker or the like, to adjust a viewing angle of a camera, adjust an audio level of an amplifier, or the like, or any combination thereof. Appropriate notification is sent to appropriate authorities, as described herein, at step 74. Providing notification to authorities is optional.

Figure 4:
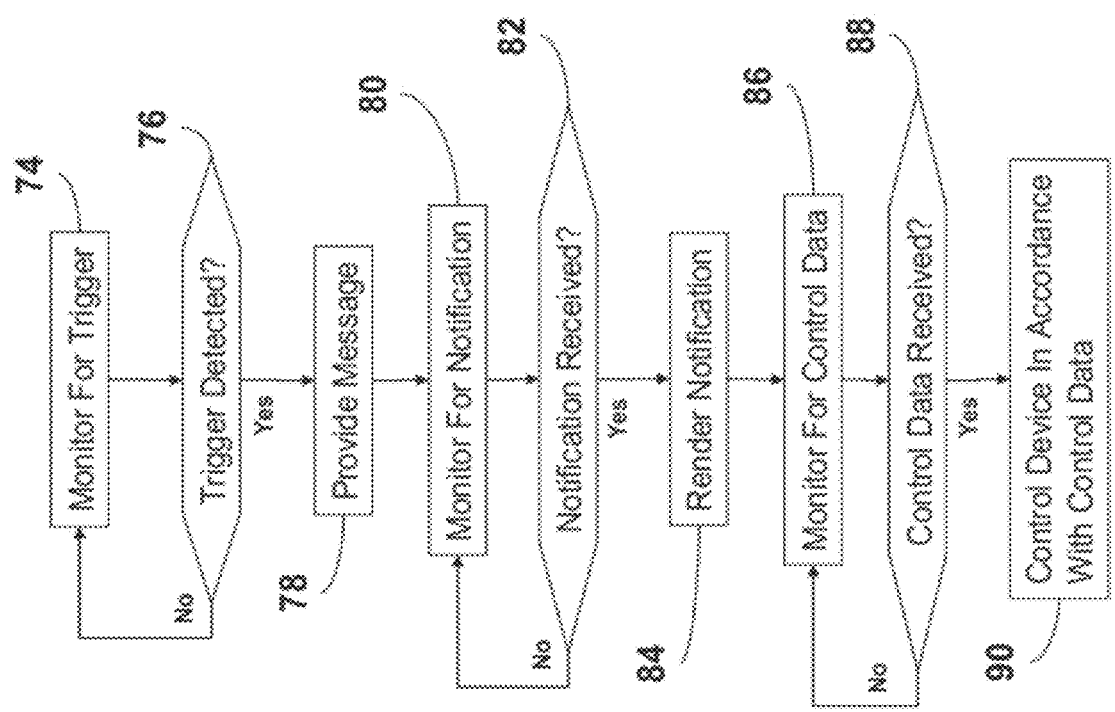
FIG. 4 is a flow diagram of an example process for implementing the security social network via a device.

FIG. 4 is a flow diagram of an example process for implementing the security social network via a device (e.g., mobile communications device 12, a registered device such as a security camera, or the like). The device monitors for a trigger at step 74. The trigger can comprise any appropriate trigger as described herein. If, at step 76, a trigger is not detected, the process proceeds to step 74 to monitor for a trigger. If, at step 76, a trigger is detected, a message is provided at step 78. The device monitors for an indication of a notification, as described herein, at step 80. If, at step 82, it is determined that no indication of a notification has been received by the device, the process proceeds to step 80. If, at step 82, it is determined that indication of a notification has been received, the device renders an indication of the notification (e.g., displays message that a member is in danger, makes sound, displays image of an individual in danger, vibrates, etc.) at step 84. The device monitors for control data, as described herein, at step 86. If, at step 88, it is determined that no control data has been received by the device, the process proceeds to step 86. If, at step 88, it is determined that control data has been received, the device is controlled in accordance with the control data at step 90.

The communications device (e.g., communications device 12 can be part of and/or in communication with various wireless communications networks. Some of which are described below.

Figure 5:
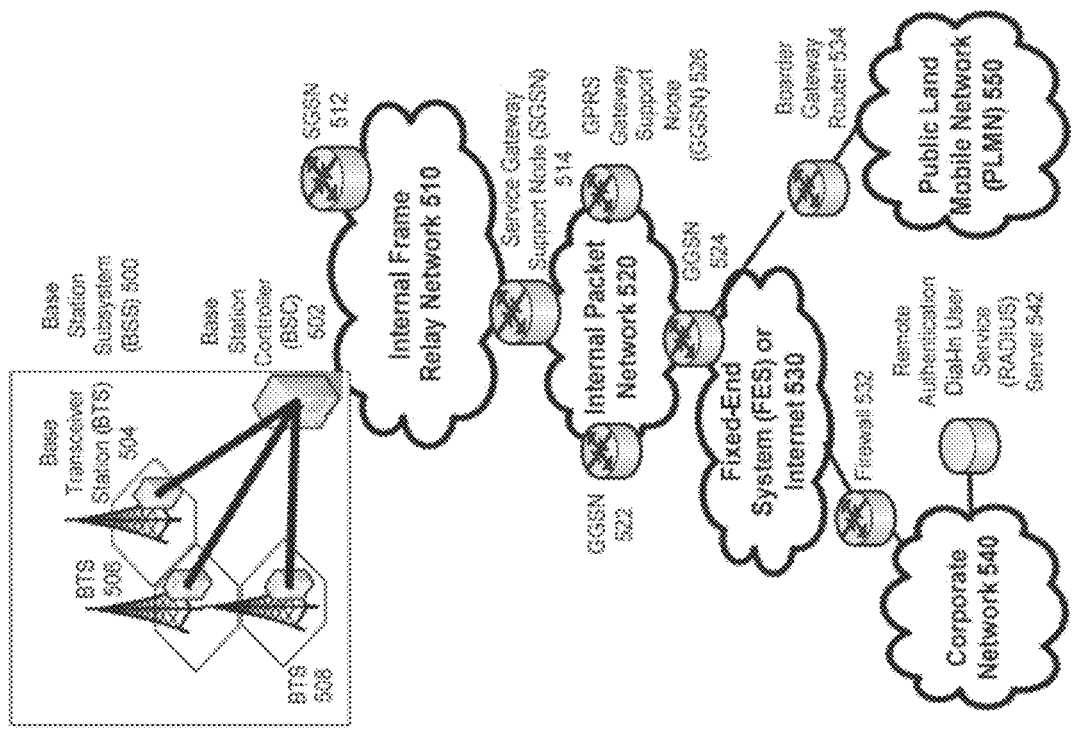
FIG. 5 depicts an overall block diagram of an exemplary packet-based mobile cellular network environment, such as a GPRS network, in which a security social network can be implemented.

FIG. 5 depicts an overall block diagram of an exemplary packet-based mobile cellular network environment, such as a GPRS network, in which a security social network can be implemented. In the exemplary packet-based mobile cellular network environment shown in FIG. 5, there are a plurality of Base Station Subsystems ("BSS") 500 (only one is shown), each of which comprises a Base Station Controller ("BSC") 502 serving a plurality of Base Transceiver Stations ("BTS") such as BTSs 504, 506, and 508. BTSs 504, 506, 508, etc. are the access points where users of packet-based mobile devices become connected to the wireless network. In exemplary fashion, the packet traffic originating from user devices is transported via an over-the-air interface to a BTS 508, and from the BTS 508 to the BSC 502. Base station subsystems, such as BSS 500, are a part of internal frame relay network 510 that can include Service GPRS Support Nodes ("SGSN") such as SGSN 512 and 514. Each SGSN is connected to an internal packet network 520 through which a SGSN 512, 514, etc. can route data packets to and from a plurality of gateway GPRS support nodes (GGSN) 522, 524, 526, etc. As illustrated, SGSN 514 and GGSNs 522, 524, and 526 are part of internal packet network 520. Gateway GPRS serving nodes 522, 524 and 526 mainly provide an interface to external Internet Protocol ("IP") networks such as Public Land Mobile Network ("PLMN") 550, corporate intranets 540, or Fixed-End System ("FES") or the public Internet 530. As illustrated, subscriber corporate network 540 may be connected to GGSN 524 via firewall 532; and PLMN 550 is connected to GGSN 524 via boarder gateway router 534. The Remote Authentication Dial-In User Service ("RADIUS") server 542 may be used for caller authentication when a user of a mobile cellular device calls corporate network 540.

Generally, there can be a several cell sizes in a GSM network, referred to as macro, micro, pico, femto and umbrella cells. The coverage area of each cell is different in different environments. Macro cells can be regarded as cells in which the base station antenna is installed in a mast or a building above average roof top level. Micro cells are cells whose antenna height is under average roof top level. Micro-cells are typically used in urban areas. Pico cells are small cells having a diameter of a few dozen meters. Pico cells are used mainly indoors. Femto cells have the same size as pico cells, but a smaller transport capacity. Femto cells are used indoors, in residential, or small business environments. On the other hand, umbrella cells are used to cover shadowed regions of smaller cells and fill in gaps in coverage between those cells.

Figure 6:
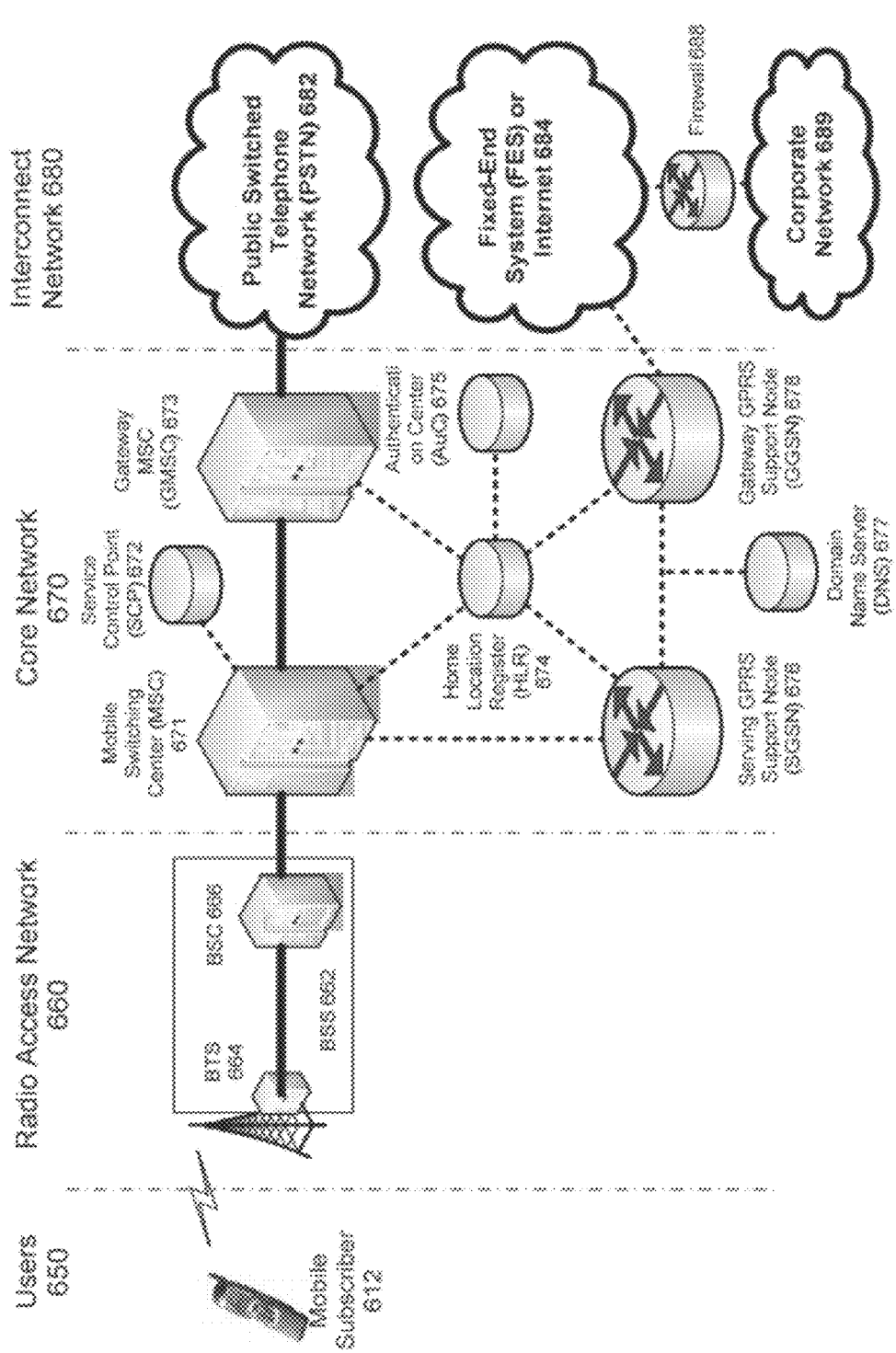
FIG. 6 illustrates an example architecture of a typical GPRS network in which a security social network can be implemented.

FIG. 6 illustrates an architecture of a typical GPRS network in which a security social network can be implemented. The architecture depicted in FIG. 6 is segmented into four groups: users 650, radio access network 660, core network 670, and interconnect network 680. Users 650 comprise a plurality of end users. Note, device 612 is referred to as a mobile subscriber in the description of network shown in FIG. 6. In an example embodiment, the device depicted as mobile subscriber 612 comprises a communications device (e.g., wireless anti-theft security communications device 12). Radio access network 660 comprises a plurality of base station subsystems such as BSSs 662, which include BTSs 664 and BSCs 666. Core network 670 comprises a host of various network elements. As illustrated in FIG. 6, core network 670 may comprise Mobile Switching Center ("MSC") 671, Service Control Point ("SCP") 672, gateway MSC 673, SGSN 676, Home Location Register ("HLR") 674, Authentication Center ("AuC") 675, Domain Name Server ("DNS") 677, and GGSN 678. Interconnect network 680 also comprises a host of various networks and other network elements. As illustrated in FIG. 6, interconnect network 680 comprises Public Switched Telephone Network ("PSTN") 682, Fixed-End System ("FES") or Internet 684, firewall 688, and Corporate Network 689.

A mobile switching center can be connected to a large number of base station controllers. At MSC 671, for instance, depending on the type of traffic, the traffic may be separated in that voice may be sent to Public Switched Telephone Network ("PSTN") 682 through Gateway MSC ("GMSC") 673, and/or data may be sent to SGSN 676, which then sends the data traffic to GGSN 678 for further forwarding.

When MSC 671 receives call traffic, for example, from BSC 666, it sends a query to a database hosted by SCP 672. The SCP 672 processes the request and issues a response to MSC 671 so that it may continue call processing as appropriate.

The HLR 674 is a centralized database for users to register to the GPRS network. HLR 674 stores static information about the subscribers such as the International Mobile Subscriber Identity ("IMSI"), subscribed services, and a key for authenticating the subscriber. HLR 674 also stores dynamic subscriber information such as the current location of the mobile subscriber. Associated with HLR 674 is AuC 675. AuC 675 is a database that contains the algorithms for authenticating subscribers and includes the associated keys for encryption to safeguard the user input for authentication.

In the following, depending on context, the term "mobile subscriber" sometimes refers to the end user and sometimes to the actual portable device, such as a mobile device, used by an end user of the mobile cellular service. When a mobile subscriber turns on his or her mobile device, the mobile device goes through an attach process by which the mobile device attaches to an SGSN of the GPRS network. In FIG. 6, when mobile subscriber 612 initiates the attach process by turning on the network capabilities of the mobile device, an attach request is sent by mobile subscriber 612 to SGSN 676. The SGSN 676 queries another SGSN, to which mobile subscriber 612 was attached before, for the identity of mobile subscriber 612. Upon receiving the identity of mobile subscriber 612 from the other SGSN, SGSN 676 requests more information from mobile subscriber 612. This information is used to authenticate mobile subscriber 612 to SGSN 676 by HLR 674. Once verified, SGSN 676 sends a location update to HLR 674 indicating the change of location to a new SGSN, in this case SGSN 676. HLR 674 notifies the old SGSN, to which mobile subscriber 612 was attached before, to cancel the location process for mobile subscriber 612. HLR 674 then notifies SGSN 676 that the location update has been performed. At this time, SGSN 676 sends an Attach Accept message to mobile subscriber 612, which in turn sends an Attach Complete message to SGSN 676.

After attaching itself with the network, mobile subscriber 612 then goes through the authentication process. In the authentication process, SGSN 676 sends the authentication information to HLR 674, which sends information back to SGSN 676 based on the user profile that was part of the user's initial setup. The SGSN 676 then sends a request for authentication and ciphering to mobile subscriber 612. The mobile subscriber 612 uses an algorithm to send the user identification (ID) and password to SGSN 676. The SGSN 676 uses the same algorithm and compares the result. If a match occurs, SGSN 676 authenticates mobile subscriber 612.

Next, the mobile subscriber 612 establishes a user session with the destination network, corporate network 689, by going through a Packet Data Protocol ("PDP") activation process. Briefly, in the process, mobile subscriber 612 requests access to the Access Point Name ("APN"), for example, UPS.com, and SGSN 676 receives the activation request from mobile subscriber 612. SGSN 676 then initiates a Domain Name Service ("DNS") query to learn which GGSN node has access to the UPS.com APN. The DNS query is sent to the DNS server within the core network 670, such as DNS 677, which is provisioned to map to one or more GGSN nodes in the core network 670. Based on the APN, the mapped GGSN 678 can access the requested corporate network 689. The SGSN 676 then sends to GGSN 678 a Create Packet Data Protocol ("PDP") Context Request message that contains necessary information. The GGSN 678 sends a Create PDP Context Response message to SGSN 676, which then sends an Activate PDP Context Accept message to mobile subscriber 612.

Once activated, data packets of the call made by mobile subscriber 612 can then go through radio access network 660, core network 670, and interconnect network 680, in a particular fixed-end system or Internet 684 and firewall 688, to reach corporate network 689.

Figure 7:
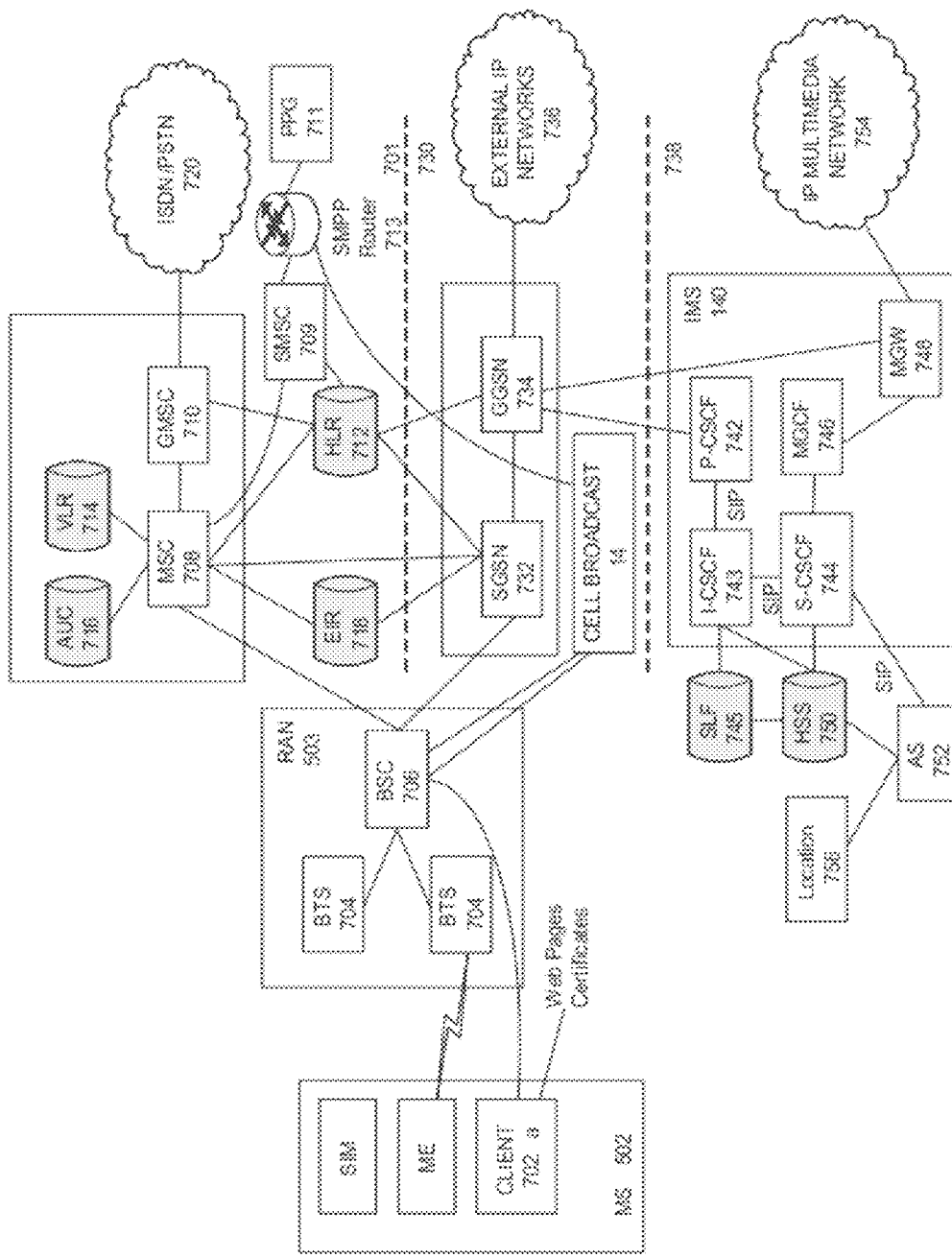
FIG. 7 illustrates an exemplary block diagram view of a GSM/GPRS/IP multimedia network architecture within which a security social network can be implemented.

FIG. 7 illustrates an exemplary block diagram view of a GSM/GPRS/IP multimedia network architecture within which a security social network can be implemented. As illustrated, the architecture of FIG. 7 includes a GSM core network 701, a GPRS network 730 and an IP multimedia network 738. The GSM core network 701 includes a Mobile Station (MS) 702, at least one Base Transceiver Station (BTS) 704 and a Base Station Controller (BSC) 706. The MS 702 is physical equipment or Mobile Equipment (ME), such as a mobile phone or a laptop computer that is used by mobile subscribers, with a Subscriber identity Module (SIM) or a Universal Integrated Circuit Card (UICC). The SIM or UICC includes an International Mobile Subscriber Identity (IMSI), which is a unique identifier of a subscriber. The BTS 704 is physical equipment, such as a radio tower, that enables a radio interface to communicate with the MS. Each BTS may serve more than one MS. The BSC 706 manages radio resources, including the BTS. The BSC may be connected to several BTSs. The BSC and BTS components, in combination, are generally referred to as a base station (BSS) or radio access network (RAN) 703.

The GSM core network 701 also includes a Mobile Switching Center (MSC) 708, a Gateway Mobile Switching Center (GMSC) 710, a Home Location Register (HLR) 712, Visitor Location Register (VLR) 714, an Authentication Center (AuC) 718, and an Equipment Identity Register (EIR) 716. The MSC 708 performs a switching function for the network. The MSC also performs other functions, such as registration, authentication, location updating, handovers, and call routing. The GMSC 710 provides a gateway between the GSM network and other networks, such as an Integrated Services Digital Network (ISDN) or Public Switched Telephone Networks (PSTNs) 720. Thus, the GMSC 710 provides interworking functionality with external networks.

The HLR 712 is a database that contains administrative information regarding each subscriber registered in a corresponding GSM network. The HLR 712 also contains the current location of each MS. The VLR 714 is a database that contains selected administrative information from the HLR 712. The VLR contains information necessary for call control and provision of subscribed services for each MS currently located in a geographical area controlled by the VLR. The HLR 712 and the VLR 714, together with the MSC 708, provide the call routing and roaming capabilities of GSM. The AuC 716 provides the parameters needed for authentication and encryption functions. Such parameters allow verification of a subscriber's identity. The EIR 718 stores security-sensitive information about the mobile equipment.

A Short Message Service Center (SMSC) 709 allows one-to-one Short Message Service (SMS) messages to be sent to/from the MS 702. A Push Proxy Gateway (PPG) 711 is used to "push" (i.e., send without a synchronous request) content to the MS 702. The PPG 711 acts as a proxy between wired and wireless networks to facilitate pushing of data to the MS 702. A Short Message Peer to Peer (SMPP) protocol router 713 is provided to convert SMS-based SMPP messages to cell broadcast messages. SMPP is a protocol for exchanging SMS messages between SMS peer entities such as short message service centers. The SMPP protocol is often used to allow third parties, e.g., content suppliers such as news organizations, to submit bulk messages.

To gain access to GSM services, such as speech, data, and short message service (SMS), the MS first registers with the network to indicate its current location by performing a location update and IMSI attach procedure. The MS 702 sends a location update including its current location information to the MSC/VLR, via the BTS 704 and the BSC 706. The location information is then sent to the MS's HLR. The HLR is updated with the location information received from the MSC/VLR. The location update also is performed when the MS moves to a new location area. Typically, the location update is periodically performed to update the database as location updating events occur.

The GPRS network 730 is logically implemented on the GSM core network architecture by introducing two packet-switching network nodes, a serving GPRS support node (SGSN) 732, a cell broadcast and a Gateway GPRS support node (GGSN) 734. The SGSN 732 is at the same hierarchical level as the MSC 708 in the GSM network. The SGSN controls the connection between the GPRS network and the MS 702. The SGSN also keeps track of individual MS's locations and security functions and access controls.

A Cell Broadcast Center (CBC) 14 communicates cell broadcast messages that are typically delivered to multiple users in a specified area. Cell Broadcast is one-to-many geographically focused service. It enables messages to be communicated to multiple mobile phone customers who are located within a given part of its network coverage area at the time the message is broadcast.

The GGSN 734 provides a gateway between the GPRS network and a public packet network (PDN) or other IP networks 736. That is, the GGSN provides interworking functionality with external networks, and sets up a logical link to the MS through the SGSN. When packet-switched data leaves the GPRS network, it is transferred to an external TCP-IP network 736, such as an X.25 network or the Internet. In order to access GPRS services, the MS first attaches itself to the GPRS network by performing an attach procedure. The MS then activates a packet data protocol (PDP) context, thus activating a packet communication session between the MS, the SGSN, and the GGSN.

In a GSM/GPRS network, GPRS services and GSM services can be used in parallel. The MS can operate in one of three classes: class A, class B, and class C. A class A MS can attach to the network for both GPRS services and GSM services simultaneously. A class A MS also supports simultaneous operation of GPRS services and GSM services. For example, class A mobiles can receive GSM voice/data/SMS calls and GPRS data calls at the same time.

A class B MS can attach to the network for both GPRS services and GSM services simultaneously. However, a class B MS does not support simultaneous operation of the GPRS services and GSM services. That is, a class B MS can only use one of the two services at a given time.

A class C MS can attach for only one of the GPRS services and GSM services at a time. Simultaneous attachment and operation of GPRS services and GSM services is not possible with a class C MS.

A GPRS network 730 can be designed to operate in three network operation modes (NOM1, NOM2 and NOM3). A network operation mode of a GPRS network is indicated by a parameter in system information messages transmitted within a cell. The system information messages dictates a MS where to listen for paging messages and how to signal towards the network. The network operation mode represents the capabilities of the GPRS network. In a NOM1 network, a MS can receive pages from a circuit switched domain (voice call) when engaged in a data call. The MS can suspend the data call or take both simultaneously, depending on the ability of the MS. In a NOM2 network, a MS may not received pages from a circuit switched domain when engaged in a data call, since the MS is receiving data and is not listening to a paging channel. In a NOM3 network, a MS can monitor pages for a circuit switched network while received data and vise versa.

The IP multimedia network 738 was introduced with 3GPP Release 7, and includes an IP multimedia subsystem (IMS) 740 to provide rich multimedia services to end users.

A representative set of the network entities within the IMS 740 are a call/session control function (CSCF), a media gateway control function (MGCF) 746, a media gateway (MGW) 748, and a master subscriber database, called a home subscriber server (HSS) 750. The HSS 750 may be common to the GSM network 701, the GPRS network 730 as well as the IP multimedia network 738.

The IP multimedia system 740 is built around the call/session control function, of which there are three types: an interrogating CSCF (I-CSCF) 743, a proxy CSCF (P-CSCF) 742, and a serving CSCF (S-CSCF) 744. The P-CSCF 742 is the MS's first point of contact with the IMS 740. The P-CSCF 742 forwards session initiation protocol (SIP) messages received from the MS to an SIP server in a home network (and vice versa) of the MS. The P-CSCF 742 may also modify an outgoing request according to a set of rules defined by the network operator (for example, address analysis and potential modification).

The I-CSCF 743, forms an entrance to a home network and hides the inner topology of the home network from other networks and provides flexibility for selecting an S-CSCF. The I-CSCF 743 may contact a subscriber location function (SLF) 745 to determine which HSS 750 to use for the particular subscriber, if multiple HSS's 750 are present. The S-CSCF 744 performs the session control services for the MS 702. This includes routing originating sessions to external networks and routing terminating sessions to visited networks. The S-CSCF 744 also decides whether an application server (AS) 752 is required to receive information on an incoming SIP session request to ensure appropriate service handling. This decision is based on information received from the HSS 750 (or other sources, such as an application server 752). The AS 752 also communicates to a location server 756 (e.g., a Gateway Mobile Location Center (GMLC)) that provides a position (e.g., latitude/longitude coordinates) of the MS 702.

The HSS 750 contains a subscriber profile and keeps track of which core network node is currently handling the subscriber. It also supports subscriber authentication and authorization functions (AAA). In networks with more than one HSS 750, a subscriber location function provides information on the HSS 750 that contains the profile of a given subscriber.

The MGCF 746 provides interworking functionality between SIP session control signaling from the IMS 740 and ISUP/BICC call control signaling from the external GSTN networks (not shown). It also controls the media gateway (MGW) 748 that provides user-plane interworking functionality (e.g., converting between AMR- and PCM-coded voice). The MGW 748 also communicates with other IP multimedia networks 754.

Push to Talk over Cellular (PoC) capable mobile phones register with the wireless network when the phones are in a predefined area (e.g., job site, etc.). When the mobile phones leave the area, they register with the network in their new location as being outside the predefined area. This registration, however, does not indicate the actual physical location of the mobile phones outside the pre-defined area.

Figure 8:
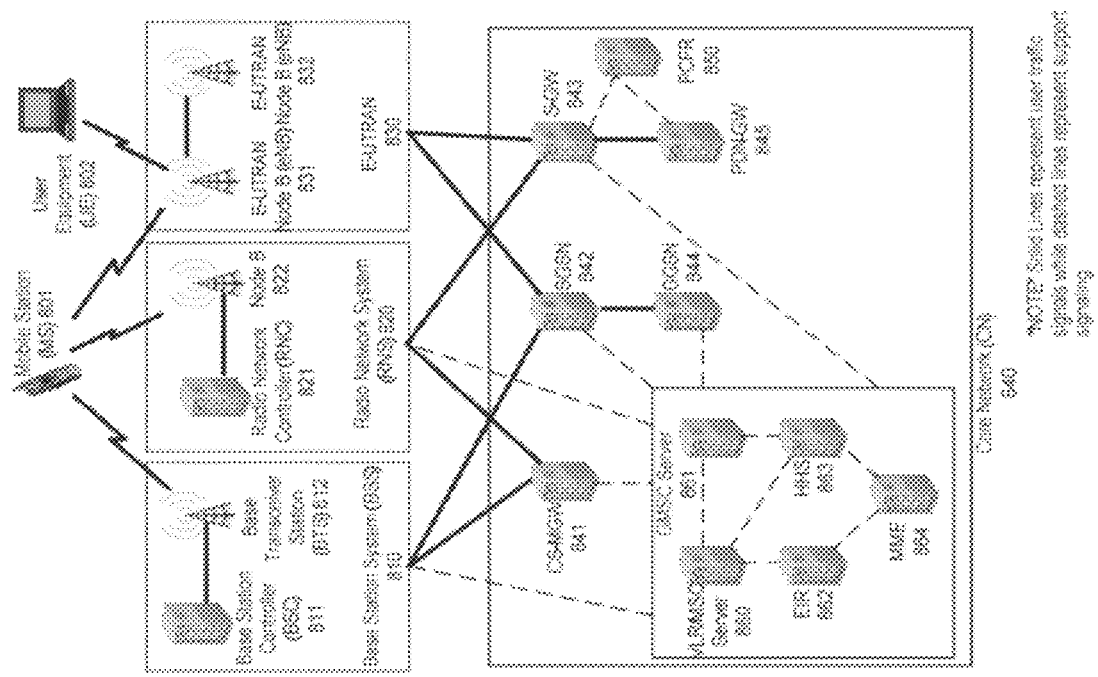
FIG. 8 illustrates a PLMN block diagram view of an exemplary architecture in which a security social network can be incorporated.

FIG. 8 illustrates a PLMN block diagram view of an exemplary architecture in which the above described embodiments of a security social network may be incorporated. Mobile Station (MS) 801 is the physical equipment used by the PLMN subscriber. In one illustrative embodiment, communications device 12 may serve as Mobile Station 801. Mobile Station 801 may be one of, but not limited to, a cellular telephone, a cellular telephone in combination with another electronic device or any other wireless mobile communication device.

Mobile Station 801 may communicate wirelessly with Base Station System (BSS) 810. BSS 810 contains a Base Station Controller (BSC) 811 and a Base Transceiver Station (BTS) 812. BSS 810 may include a single BSC 811/BTS 812 pair (Base Station) or a system of BSC/BTS pairs which are part of a larger network. BSS 810 is responsible for communicating with Mobile Station 801 and may support one or more cells. BSS 810 is responsible for handling cellular traffic and signaling between Mobile Station 801 and Core Network 840. Typically, BSS 810 performs functions that include, but are not limited to, digital conversion of speech channels, allocation of channels to mobile devices, paging, and transmission/reception of cellular signals.

Additionally, Mobile Station 801 may communicate wirelessly with Radio Network System (RNS) 820. RNS 820 contains a Radio Network Controller (RNC) 821 and one or more Node(s) B 822. RNS 820 may support one or more cells. RNS 820 may also include one or more RNC 821/Node B 822 pairs or alternatively a single RNC 821 may manage multiple Nodes B 822. RNS 820 is responsible for communicating with Mobile Station 801 in its geographically defined area. RNC 821 is responsible for controlling the Node(s) B 822 that are connected to it and is a control element in a UMTS radio access network. RNC 821 performs functions such as, but not limited to, load control, packet scheduling, handover control, security functions, as well as controlling Mobile Station 801's access to the Core Network (CN) 840.

The evolved UMTS Terrestrial Radio Access Network (E-UTRAN) 830 is a radio access network that provides wireless data communications for Mobile Station 801 and User Equipment 802. E-UTRAN 830 provides higher data rates than traditional UMTS. It is part of the Long Term Evolution (LTE) upgrade for mobile networks and later releases meet the requirements of the International Mobile Telecommunications (IMT) Advanced and are commonly known as a 4G networks. E-UTRAN 830 may include of series of logical network components such as E-UTRAN Node B (eNB) 831 and E-UTRAN Node B (eNB) 832. E-UTRAN 830 may contain one or more eNBs. User Equipment 802 may be any user device capable of connecting to E-UTRAN 830 including, but not limited to, a personal computer, laptop, mobile device, wireless router, or other device capable of wireless connectivity to E-UTRAN 830. The improved performance of the E-UTRAN 830 relative to a typical UMTS network allows for increased bandwidth, spectral efficiency, and functionality including, but not limited to, voice, high-speed applications, large data transfer and IPTV, while still allowing for full mobility.

An exemplary embodiment of a mobile data and communication service that may be implemented in the PLMN architecture described in FIG. 8 is the Enhanced Data rates for GSM Evolution (EDGE). EDGE is an enhancement for GPRS networks that implements an improved signal modulation scheme known as 8-PSK (Phase Shift Keying). By increasing network utilization, EDGE may achieve up to three times faster data rates as compared to a typical GPRS network. EDGE may be implemented on any GSM network capable of hosting a GPRS network, making it an ideal upgrade over GPRS since it may provide increased functionality of existing network resources. Evolved EDGE networks are becoming standardized in later releases of the radio telecommunication standards, which provide for even greater efficiency and peak data rates of up to 1 Mbit/s, while still allowing implementation on existing GPRS-capable network infrastructure.

Typically Mobile Station 801 may communicate with any or all of BSS 810, RNS 820, or E-UTRAN 830. In a illustrative system, each of BSS 810, RNS 820, and E-UTRAN 830 may provide Mobile Station 801 with access to Core Network 840. The Core Network 840 may include of a series of devices that route data and communications between end users. Core Network 840 may provide network service functions to users in the Circuit Switched (CS) domain, the Packet Switched (PS) domain or both. The CS domain refers to connections in which dedicated network resources are allocated at the time of connection establishment and then released when the connection is terminated. The PS domain refers to communications and data transfers that make use of autonomous groupings of bits called packets. Each packet may be routed, manipulated, processed or handled independently of all other packets in the PS domain and does not require dedicated network resources.

The Circuit Switched—Media Gateway Function (CS-MGW) 841 is part of Core Network 840, and interacts with Visitor Location Register (VLR) and Mobile-Services Switching Center (MSC) Server 860 and Gateway MSC Server 861 in order to facilitate Core Network 840 resource control in the CS domain. Functions of CS-MGW 841 include, but are not limited to, media conversion, bearer control, payload processing and other mobile network processing such as handover or anchoring. CS-MGW 840 may receive connections to Mobile Station 801 through BSS 810, RNS 820 or both.

Serving GPRS Support Node (SGSN) 842 stores subscriber data regarding Mobile Station 801 in order to facilitate network functionality. SGSN 842 may store subscription information such as, but not limited to, the International Mobile Subscriber Identity (IMSI), temporary identities, or Packet Data Protocol (PDP) addresses. SGSN 842 may also store location information such as, but not limited to, the Gateway GPRS Support Node (GGSN) 844 address for each GGSN where an active PDP exists. GGSN 844 may implement a location register function to store subscriber data it receives from SGSN 842 such as subscription or location information.

Serving Gateway (S-GW) 843 is an interface which provides connectivity between E-UTRAN 830 and Core Network 840. Functions of S-GW 843 include, but are not limited to, packet routing, packet forwarding, transport level packet processing, event reporting to Policy and Charging Rules Function (PCRF) 850, and mobility anchoring for inter-network mobility. PCRF 850 uses information gathered from S-GW 843, as well as other sources, to make applicable policy and charging decisions related to data flows, network resources and other network administration functions. Packet Data Network Gateway (PDN-GW) 845 may provide user-to-services connectivity functionality including, but not limited to, network-wide mobility anchoring, bearer session anchoring and control, and IP address allocation for PS domain connections.

Home Subscriber Server (HSS) 863 is a database for user information, and stores subscription data regarding Mobile Station 801 or User Equipment 802 for handling calls or data sessions. Networks may contain one HSS 863 or more if additional resources are required. Exemplary data stored by HSS 863 include, but is not limited to, user identification, numbering and addressing information, security information, or location information. HSS 863 may also provide call or session establishment procedures in both the PS and CS domains.

The VLR/MSC Server 860 provides user location functionality. When Mobile Station 801 enters a new network location, it begins a registration procedure. A MSC Server for that location transfers the location information to the VLR for the area. A VLR and MSC Server may be located in the same computing environment, as is shown by VLR/MSC Server 860, or alternatively may be located in separate computing environments. A VLR may contain, but is not limited to, user information such as the IMSI, the Temporary Mobile Station Identity (TMSI), the Local Mobile Station Identity (LMSI), the last known location of the mobile station, or the SGSN where the mobile station was previously registered. The MSC server may contain information such as, but not limited to, procedures for Mobile Station 801 registration or procedures for handover of Mobile Station 801 to a different section of the Core Network 840. GMSC Server 861 may serve as a connection to alternate GMSC Servers for other mobile stations in larger networks.

Equipment Identity Register (EIR) 862 is a logical element which may store the International Mobile Equipment Identities (IMEI) for Mobile Station 801. In a typical embodiment, user equipment may be classified as either "white listed" or "black listed" depending on its status in the network. In one embodiment, if Mobile Station 801 is stolen and put to use by an unauthorized user, it may be registered as "black listed" in EIR 862, preventing its use on the network. Mobility Management Entity (MME) 864 is a control node which may track Mobile Station 801 or User Equipment 802 if the devices are idle. Additional functionality may include the ability of MME 864 to contact an idle Mobile Station 801 or User Equipment 802 if retransmission of a previous session is required.

While example embodiments of a security social network have been described in connection with various computing devices/processors, the underlying concepts can be applied to any computing device, processor, or system capable of facilitate a security social network as described herein. The methods and apparatuses for facilitating a security social network, or certain aspects or portions thereof, can take the form of program code (i.e., instructions) embodied in tangible storage media having a physical structure, such as floppy diskettes, CD-ROMs, hard drives, or any other machine-readable storage medium (computer-readable storage medium), wherein, when the program code is loaded into and executed by a machine, such as a computer, the machine becomes an apparatus for implementing a security social network. A computer-readable storage medium, as described herein is an article of manufacture. In the case of program code execution on programmable computers, the computing device will generally include a processor, a storage medium readable by the processor (including volatile and non-volatile memory and/or storage elements), at least one input device, and at least one output device. The program(s) can be implemented in assembly or machine language, if desired. The language can be a compiled or interpreted language, and combined with hardware implementations.

The methods and apparatuses for a security social network can be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, or the like, the machine becomes an apparatus for facilitating a security social network. When implemented on a general-purpose processor, the program code combines with the processor to provide a unique apparatus that operates to invoke the functionality the security social network.

While a security social network has been described in connection with the various embodiments of the various figures, it is to be understood that other similar embodiments can be used or modifications and additions can be made to the described embodiments for facilitating a security social network. For example, one skilled in the art will recognize that using a communications device to facilitate a security social network as described in the present application may apply to any environment, whether wired or wireless, and may be applied to any number of such devices connected via a communications network and interacting across the network. Therefore, a security social network should not be limited to any single embodiment, but rather should be construed in breadth and scope in accordance with the appended claims.

What is claimed:

1. A network entity comprising:
    a processor; and
    memory coupled to the processor, the memory comprising instructions that when executed by the processor cause the processor to effectuate operations comprising:
        receiving a message indicative of being sent by a first registered member of a security social network, the security social network facilitating communications between registered members and registered devices for providing physical security and wherein the registered members have a common security interest with each other,
        wherein the message comprises:
            an expected region for the location of the first registered member during a time frame,
            an expected return location of the first registered member at or before a first time associated with the time frame, and
            an indication to the security social network to monitor the expected region;
        determining a location of the first registered member based on the received message;
        determining a region proximate to the determined location based on the received message;
        selecting a plurality of registered members of the security social network within the region to be notified when the first registered member is not at the expected return location at or before the first time associated with the time frame; and
        in response to the first registered member not at the expected return location at or before the first time,
            determining a registered device that is registered with the security social network that is within the region;
            providing control information for reception by the determined registered device that is registered with the security social network based on the received message; and
            sending a notification to the selected plurality of registered members, wherein the notification comprises information from registered devices of the security social network.

2. The network entity of claim 1, wherein the registered device comprises a microphone.

3. The network entity of claim 2, wherein:
the registered device comprises at least one of a camera or a microphone.

4. The network entity of claim 1, wherein the information from registered devices comprises video, images, or audio.

5. The network entity of claim 1, wherein:
the message is indicative of an event pertaining to the first registered member sending the message; and
the notification is indicative of the event.

6. The network entity of claim 1, wherein:
a member of the security social network sent the message; and
the member of the security social network that sent the message is provided a credit for sending the message.

7. A method comprising:
receiving, by a server, a message indicative of being sent by a first registered member of a security social network, the security social network facilitating communications between registered members and registered devices for providing physical security and wherein the registered members have a common security interest with each other,
wherein the message comprises:
an expected region for the location of the first registered member during a time frame,
an expected return location of the first registered member at or before a first time associated with the time frame, and
an indication to the security social network to monitor the expected region;
determining, by the server, a location of the first registered member based on the received message;
determining, by the server, a region proximate to the determined location based on the received message;
selecting, by the server, a plurality of registered members of the security social network within the region to be notified when the first registered member is not at the expected return location at or before the first time associated with the time frame; and
in response to the first registered member not at the expected return location at or before the first time,
determining, by the server, a registered device that is registered with the security social network that is within the region;
providing control information for reception by the determined registered device that is registered with the security social network based on the received message; and
sending, by the server, a notification to the selected plurality of registered members, wherein the notification comprises information from registered devices of the security social network.

8. The method of claim 7, wherein the registered device comprises a microphone.

9. The method of claim 8, wherein:
the registered device comprises at least one of a camera or a microphone.

10. The method of claim 7, wherein the information from registered devices comprises video, images, or audio.

11. The method of claim 7, wherein:
the message is indicative of an event pertaining to the first registered member sending the message; and
the notification is indicative of the event.

12. The method of claim 7, wherein:
a member of the security social network sent the message; and
the member of the security social network that sent the message is provided a credit for sending the message.

13. A non-transitory computer readable storage medium comprising computer executable instructions that when executed by a computing device cause said computing device to effectuate operations comprising:
receiving, by the computing device, a message indicative of being sent by a first registered member of a security social network, the security social network facilitating communications between registered members and registered devices for providing physical security and wherein the registered members have a common security interest with each other,
wherein the message comprises:
an expected region for the location of the first registered member during a time frame,
an expected return location of the first registered member at or before a first time associated with the time frame, and
an indication to the security social network to monitor the expected region;
determining, by the computing device, a location of the first registered member based on the received message;
determining, by the computing device, a region proximate to the determined location based on the received message;
selecting, by the computing device, a plurality of registered members of the security social network within the region to be notified when the first registered member is not at the expected return location at or before the first time associated with the time frame; and
in response to the first registered member not at the expected return location at or before the first time,
determining, by the computing device, a registered device that is registered with the security social network that is within the region;
providing control information for reception by the determined registered device that is registered with the security social network based on the received message; and
sending, by the computing device, a notification to the selected plurality of registered members, wherein the notification comprises information from registered devices of the security social network.

14. The non-transitory computer readable storage medium of claim 13, wherein the registered device comprises a microphone.

15. The non-transitory computer readable storage medium of claim 14, wherein:
the registered device comprises at least one of a camera or a microphone.

16. The non-transitory computer readable storage medium of claim 13, wherein the information from registered devices comprises video, images, or audio.

17. The non-transitory computer readable storage medium of claim 13, wherein:
the message is indicative of an event pertaining to the first registered member sending the message; and
the notification is indicative of the event.

18. The non-transitory computer readable storage medium of claim 13, wherein:
a member of the security social network sent the message; and
the member of the security social network that sent the message is provided a credit for sending the message.

* * * * *